(12) United States Patent
Balakrishnan et al.

(10) Patent No.: US 7,738,376 B2
(45) Date of Patent: *Jun. 15, 2010

(54) MANAGING TRAFFIC WITHIN A DATA COMMUNICATION NETWORK

(75) Inventors: Garesh Balakrishnan, Morrisville, NC (US); John P. Chalmers, Cary, NC (US); Clark D. Jeffries, Durham, NC (US); Jitesh R. Nair, Austin, TX (US); Larry W. Nicholson, Chapel Hill, NC (US); Ravinder K. Sabhikhi, Cary, NC (US); Raj K. Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 344 days.

This patent is subject to a terminal disclaimer.

(21) Appl. No.: 11/766,190

(22) Filed: Jun. 21, 2007

(65) Prior Publication Data
US 2007/0268826 A1 Nov. 22, 2007

Related U.S. Application Data

(63) Continuation of application No. 10/405,673, filed on Apr. 1, 2003, now Pat. No. 7,274,666.

(51) Int. Cl.
*H04L 12/26* (2006.01)
(52) U.S. Cl. .................. 370/232; 370/252; 370/235; 370/229
(58) Field of Classification Search ............ None
See application file for complete search history.

(56) References Cited

U.S. PATENT DOCUMENTS

| 6,247,061 B1 * | 6/2001 | Douceur et al. ........... 709/240 |
| 6,252,848 B1 * | 6/2001 | Skirmont ................. 370/229 |
| 6,646,988 B1 | 11/2003 | Nandy et al. |
| 6,690,645 B1 | 2/2004 | Aweya et al. |
| 6,870,811 B2 | 3/2005 | Barket et al. |
| 6,904,015 B1 | 6/2005 | Chen et al. |

(Continued)

FOREIGN PATENT DOCUMENTS

KR 2006-0065385 6/2006

*Primary Examiner*—Huy D Vu
*Assistant Examiner*—James P Duffy
(74) *Attorney, Agent, or Firm*—Patrick J. Daugherty; Driggs, Hogg, Daugherty & Del Zoppo Co., LPA

(57) ABSTRACT

A flow control method and system including an algorithm for deciding to transmit an arriving packet into a processing queue or to discard it, or, in the case of instructions or packets that must not be discarded, a similar method and system for deciding at a service event to transmit an instruction or packet into a processing queue or to skip the service event. The transmit probability is increased or decreased in consideration of minimum and maximum limits for each flow, aggregate limits for sets of flows, relative priority among flows, queue occupancy, and rate of change of queue occupancy. The effects include protection of flows below their minimum rates, correction of flows above their maximum rates, and, for flows between minimum and maximum rates, reduction of constituent flows of an aggregate that is above its aggregate maximum. Practice of the invention results in low queue occupancy during steady congestion.

20 Claims, 7 Drawing Sheets

U.S. PATENT DOCUMENTS

| | | |
|---|---|---|
| 6,977,943 B2 | 12/2005 | Zboril |
| 6,912,226 B2 | 6/2006 | De Cnodder et al. |
| 7,554,919 B1 * | 6/2009 | Veeragandham et al. .... 370/236 |
| 2003/0023733 A1 * | 1/2003 | Lingafelt et al. ............ 709/229 |
| 2003/0067878 A1 * | 4/2003 | Zboril ........................ 370/235 |
| 2003/0223366 A1 * | 12/2003 | Jeffries et al. ................ 370/231 |
| 2004/0179473 A1 | 9/2004 | Thibodeau et al. |

* cited by examiner

400

MANAGING TRAFFIC WITHIN A DATA COMMUNICATION NETWORK

RELATED APPLICATIONS

This application is a continuation of application Ser. No. 10/405,673, filed Apr. 1, 2003, now U.S. Pat. No. 7,274,666 B2, issued Sep. 25, 2007.

BACKGROUND OF THE INVENTION

1. Technical Field

The present invention relates to computer networks in general and in particular to congestion management in computer networks.

2. Prior Art

Computer networks are an important mode for communicating and disseminating information. Network administrators are demanding more tools and features to enable profitable services. The tools and features should be simple to understand and implement.

Even though computer networks are diverse entities, a typical one includes end user terminals or workstations coupled by an infrastructure which includes transmission network and interconnecting devices. The transmission network may include transmission media such as optical fiber, wireless, wired, or similar communication media. The infrastructure may be as elaborate as the WWW (Worldwide Web) better known as the Internet or as simple as a local area network (LAN) using ethernet or token ring technology. The public switch telephone network is also an infrastructure for network users. The interconnecting devices, providing access to the transmission media, may include switches, routers, bridges, network interface cards (NICs), or similar devices.

A switch is a network node that directs datagrams on the basis of Medium Access Control (MAC) addresses, that is, Layer 2 in the OSI (Open System Interconnect) model well known to those skilled in the art. A switch can also be thought of as a multiport bridge, a bridge being a device that connects two Local Area Network (LAN) segments together and forwards packets on the basis of Layer 2 data.

A router is a network node that directs datagrams on the basis of finding the longest prefix in a routing table of prefixes that matches the Internet Protocol (IP) destination addresses of a datagram, all within Layer 3 in the OSI model. A Network Interface Card (NIC) is a device that interfaces a network such as the Internet with an edge resource such as a server, cluster of servers, or server farm. A NIC might classify traffic in both directions for the purpose of fulfilling Service Level Agreements (SLAs) regarding Quality of Service (QoS). A NIC may also enforce security policies. Security policies might include dropping packets classified as malicious or as inappropriately directed. Security policies might also include limiting the bandwidth of some flows during congestion, for example, during a Denial of Service attack.

In order to manage data and provide for Quality of Service (QoS) in said network devices, data packets are placed into pipes or flows. A flow control mechanism controls the rate at which data packets are moved from flows into a service queue for further servicing.

A common prior art flow control of packets in computer networks is called Random Early Detection (RED). This function is positioned to be effective as packets arrive. A packet is called transmitted if the decision of flow control is to enqueue it in a buffer to await processing. A packet is called discarded if the decision of flow control is to delete it. Queue occupancy can be expressed as a fraction of total capacity, so 0 represents no packets awaiting processing and 1 represents complete use of the buffer to store packets. As queue length in the buffer grows from 0 to a threshold Lo>=0, RED at first transmits all packets into the queue. As queue occupancy exceeds Lo and increases further, a decreasing fraction of packets is transmitted into the queue. Finally, if occupancy reaches or exceeds a threshold Hi<=1, RED completely discards all arriving packets. In general 0<=Lo<=Hi<=1. The value of queue length in the buffer relative to these thresholds determines whether RED transmits or discards offered packets. For queue occupancy Q that is between Lo and Hi, the fraction T of packets transmitted can be a linear function of the following form:

$T(Q)=1-(1-Tmin)*(Q-Lo)/(Hi-Lo)$; where * represents multiplication operator.

Here Tmin is a minimum transmitted fraction reached as Q increases to Hi. Many variations on this theme are practiced in the prior art; for example, Q might actually be an exponentially weighted moving average of queue occupancy. As another example, Lo=Hi, the special case known as taildrop flow control. That is, taildrop flow control calls for transmitting all packets if Q is less than Lo=Hi, otherwise transmitting no packets.

The use of multiple thresholds (weights) is called Weighted RED (WRED).

The use of RED or WRED (including many variants) unfortunately can imply some undesirable consequences including:

1. RED and WRED ignore rate of change of queue (queue going up, down)
2. High thresholds can cause high latency and lack of headroom for bursts
3. Low thresholds can cause burst-shaving (low utilization)
4. There is no direct relationship between thresholds and performance
5. Administrative input can be needed to retune thresholds as offered loads change
6. Hand-tuning thresholds is widely recognized as difficult
7. Little or no guidance appears in vendor documents.
8. Bandwidth allocation for hierarchies of bandwidth limits cannot be easily provided
9. Bandwidth allocation that respects priority cannot be easily provided.

A drawback of prior art techniques is that the decision to transmit or discard an arriving packet is made in the device based upon heuristically determined threshold or functions. A queue threshold has little or nothing to do with key characteristics of flows. Threshold flow control systems can also be subject to high queuing latency during even a small degree of oversubscription.

In view of the above RED or WRED does not give a network administrator sufficient control to manage a computer network efficiently. As a consequence a system and method are required to provide the necessary control.

SUMMARY OF THE INVENTION

The present invention describes a system and method for making intelligent, high-speed flow control decisions. The decision is based upon factors that are characteristic of flows. The factors include minimum, maximum, aggregate maximum values, etc. The factors are used to calculate transmit probabilities Ti which are compared against random numbers to make transmit and no-transmit (discard the packet or, in other applications, momentarily stall processing the packet or instruction) decisions for offered packets. If flows are organized in administrative aggregates such as VLANs with common value, then each behavior aggregate flow might have its own Lo, Hi, Tmin. (The use of a hierarchy, that is, an aggregate of aggregates is discussed below.)

The above drawback indicates a need to use automatic flow control to replace RED and WRED. Provided mins, maxs, and aggregate maxs are physically possible to provide, an automatic flow control system should automatically do so and should also enable allocation by priority, if desired. No threshold tuning or other adjustments should be part of an automatic flow control system.

The present invention allows control for pipes and indexed pipes that are arranged in administrative sets. For the sake of illustration, the pipes and administrative sets described herein are flows such as VLANs and aggregates of VLANs called Virtual Ports (VPs). However, this illustration is not meant to limit the scope of the invention or its application to logically equivalent pipes and aggregates of pipes.

Sets of flows such as VLANs may be designated as an aggregate such as a Virtual Port (VP). Any two aggregates such as VPs might or might not intersect. Administrators may wish to allocate bandwidth hierarchically so that there are flow-level guarantees and limits and in addition aggregate-level limits.

In conventional systems, QoS performance concepts are sometimes imprecise, and weights are used that allocate bandwidth relatively but not absolutely. It can be difficult or impossible to predict for given offered traffic loads what the quantitative allocations will actually be. It might happen that the bandwidth guarantees sold to premium customers cannot be reliably delivered. This is, of course, highly undesirable. The present invention makes the administration process simple and inexpensive. The effect of the present invention enables a systematic approach to bandwidth allocation that is easy to understand by both bandwidth administrators and bandwidth customers. The outcome of any combination of offered loads can be predicted to conform to min, max, aggregate max, and priority specifications. As used in this document, priority relates to special importance that an administrator may place upon a flow or pipe. Therefore, simple reasoning can be used to understanding the allocation that will result from any combination of offered traffic loads.

The present invention includes a flow control approach to give a good approximation of ideal Hierarchical Traffic Management bandwidth allocations. The invention is simple and robust. Each flow, indexed by integer i and labeled flowi, has a minimum (mini) bandwidth value and a maximum (maxi) bandwidth value. (The values can be default values 0 and link speed, which effectively leave the min and max capabilities unused.) Likewise, each aggregate, indexed by integer j, has a maximum aggregate value denoted aggj. The values must satisfy administrative requirements as follows:

Admin1: For any flowi,

0<=mini<=maxi<=link bandwidth (physical limit)

Admin2: For any aggregate j, sum of all constituent flow mins<=aggj<=link bandwidth (physical limit)

A time interval [t-Dt, t) is expressed relative to present time t and consists of all time that is greater than or equal to t-Dt but less than t. This interval is used to sample the bit rates of all flows. Sums of constituent flow rates are aggregate flow rates.

The characteristics of the allocation provided by the present invention include:

A. If flowi consistently offers less traffic than its mini, then the probability fraction Ti for flowi will quickly increase to a maximum of 1, bringing the transmitted rate up to the offered rate.

B. If flowi consistently offers more traffic than its maxi, then the transmit fraction Ti for flowi will quickly decrease toward a minimum of 0, bringing the transmitted rate down until the transmitted rate becomes a value not greater than maxi.

C. Any flowi, except one already protected by characteristic A, in any aggregate j with aggregate transmitted rate greater than aggj will be subject to flow control that corrects this by reducing the transmit probability Ti of flowi.

D. Total utilization will be near optimal, meaning no flow that is only partly transmitted could be allowed more processing bandwidth without violating characteristics A, B, or C.

E. The allocation is fair, in particular in the sense that during constant offered loads, two flows that have the same min and max, are members of exactly the same aggregates, and offer the same traffic loads will be allocated the same processing bandwidth.

F. During steady congestion, Queue occupancy will be a low such value such as $1/16$ of total Queue capacity.

Note that if aggj is the sum of its constituent flow maxs, then it follows trivially from characteristic A that the aggregate itself will be allocated at most its aggj. An aggregate j with aggj smaller than the sum of its constituent flow maxs can be subject to flow control that will in general further restrict aggregate bandwidth to aggj. This is the hierarchical aspect of the present invention.

To elaborate, as packets arrive, each is recognized by flow membership. Flow number i=0, with i some value in {1, 2, ..., N-1}, that is, flowi, has a current transmit probability Ti. After a packet is recognized, the corresponding Ti is fetched and compared to a random number. If Ti>=the random number, then the packet is transmitted. Else it is discarded or stalled (depending upon the flow control type).

In a preferred embodiment, the value of Ti is updated with the same period Dt as the flow rate sample time. In a preferred embodiment of the transmit/discard type of flow control discussed herein, the value of Dt should be about equal to ($1/8$)*Queue capacity/(maximum total flow rate)

This definition insures that queue occupancy cannot change by more than $1/8$ of capacity every Dt.

In the transmit/stall type of flow control discussed herein, the value of Dt must be chosen small enough so that no physically possibly, sudden burst of demand could result in tardy reaction of flow control that violates guarantees.

If transmitted traffic in flowi is consistently above its maxi, the transmit probability is promptly, after a few Dt intervals, reduced to correct this. If the bit rate or instruction rate of transmitted traffic in flowi is consistently below its mini, then the transmit probability Ti promptly reaches 1, that is, after a few Dt intervals, all arriving instructions or packets are transmitted. Likewise, if the bit rate of transmitted traffic in flowi is consistently above its maxi, then the transmit probability Ti promptly declines toward 0, that is, after a few Dt intervals, few arriving packets or instructions are transmitted. This is how characteristics A and B, already discussed, are enabled. Likewise, except for flows already below their flow mins, any flow in an aggregate j with aggregate rate above aggj will be subject to additional flow control to reduce aggregate j flow.

The transmit probability Ti of flowi should be frequently and stably updated in response to Queue occupancy Q as follows:
1. If the current traffic in flowi is below its mini, then Ti should increase by adding a constant C, such as C=1/16, so that Ti increases up to a maximum value of 1.
2. Else if the current traffic in flowi is above its maxi, then Ti should decrease by multiplying it by a constant K with positive value<1, such as K=31/32.
3. Elseif the flowi is in any aggregate j in which the current aggregate flow is above the aggregate max aggj, then the value of Ti should decrease by multiplying it by a constant K with positive value<1, such as K=31/32.
4. Elseif
   Q<a low threshold fraction Thi of Queue capacity (specified below)
   OR {if Q<a larger but sill low threshold such as 2*Thi of Queue capacity AND Queue occupancy is decreasing}
   then Ti should increase by adding a constant, such as Ci (specified below), up to a maximum value of 1.
5. Else Ti should decrease toward a minimum of 0 by subtracting the product of a constant Di (specified below) times flowi rate divided by maximum processing sending capacity S.

If flowi offers traffic to the flow control system at a rate very near its flow mini and if the time interval for measuring bandwidth results in some measurement error, then that error can be reflected in small deviations from the above characteristic B. In commercial applications, some allowance should be made for this approximation.

Step 3 in the algorithm also includes testing whether or not the current sum of all traffic in any aggregate j containing flowi exceeds aggj. This is the hierarchical part of the invention.

Step 4 of the algorithm includes testing whether or not total Queue occupancy Q is decreasing, that is, present Q<previous Q. The effect of using this indicator is to reduce the oscillations in flow, Ti, and Q values that could otherwise occur.

DETAILED DESCRIPTION OF INVENTION

Figure 1:
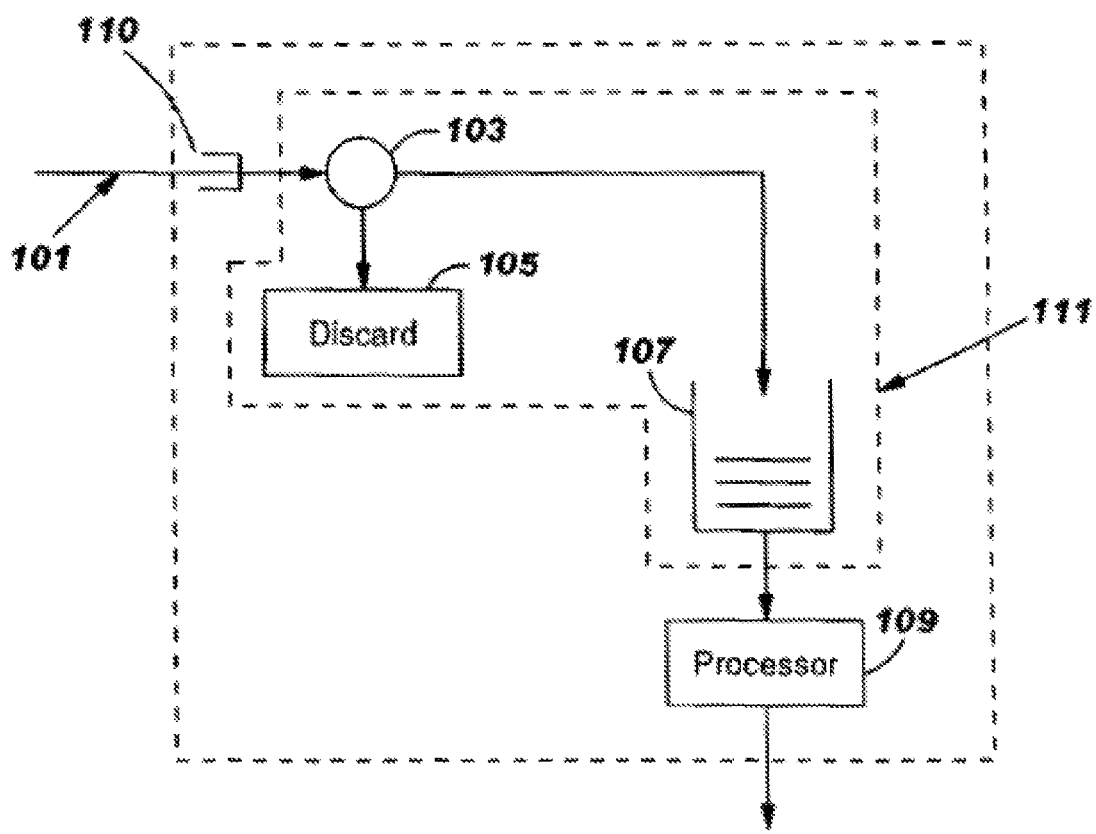
FIG. 1 shows a conventional transmit/discard flow control that during congestion can limit the occupancy of a queue by discarding proactively part of an offered load. Although only one offered load is shown, those skilled in the art understand that different copies of the same mechanism for different classes of service would be typical.

A computer network administrator is usually required to manage and keep the computer network running. The administrator relies on tools, such as the one disclosed in the present invention, to assist in managing the network. As part of the management, an administrator may need to configure a network to provide certain services. For example, hosts or other entities that are in physically different LANs but united administratively can be configured in a Virtual LAN (VLAN). In turn VLANs can be organized administratively into sets called Virtual Ports (VPs). This type of configuration is deemed hierarchical and could also be practiced with any sort of flows of packets or instructions.

A switch, router, or NIC might treat packets within one VLAN as having equivalent value when episodes of congestion arise. Any of these network nodes might also allow management of packets according to VP membership. The present invention applies to a network node that can be a switch, a router, NIC, or, more generally, a machine capable of classifying, switching, routing, policing functions, or other security functions based upon classification results, including management of packets according to VLAN or VP membership and current congestion conditions.

More generally in the operation of storage networks, reaction to congestion can take the form of rate control. This means that packets are simple stalled momentarily in a queue as opposed to being discarded. In some storage networks latency is not the primary issue. Rather, zero loss can be desired. In this case the rate at which packets are sent from a sending unit is modulated. The present invention provides rate control applicable to storage networks.

In yet another instance, processing of computer instruction workloads submitted to a processor can become congested. Herein instructions are the logical units, not packets. The goal can be momentary stalling of processing of instructions of one type (in one pipe) and transmitting instructions in another pipe to the processor for the sake of enforcing instruction processing guarantees or priorities. Instruction can be stalled, not discarded, in general. The present invention provides rate control applicable to instruction processing.

For the sake of brevity in the following, flow control (transmit or discard packets into a processing buffer) or rate control (transmit or delay packets into a processing buffer, or transmit or delay instructions into a processing buffer) are called simply flow control. In the case of packets the present invention provides a probability for the transmit/discard decision or the transmit/delay decision. In the case of instructions, the present invention provides a probability for the transmit/delay decision.

Concepts or features of the present invention include a minimum bandwidth guarantee (min). If the offered rate of a flow such as all the packets in a VLAN is steady and below its min, then all of the packets or instructions of the flow should be transmitted into the queue of packets or instructions for a processor. Another concept is a maximum bandwidth limit (max). If the offered rate of a flow is steady and if its transmitted rate is above its max, then the fraction of transmitted packets of the flow should decrease by exercising a discard mechanism or a stall mechanism until the transmitted rate is below its max. Another concept is aggregate bandwidth limit, a hierarchical concept. If the offered rate of a flow is steady, if its transmitted rate is between its min and max, and if the sum of the transmitted rate and the transmitted rates of other flows within an aggregate of flows is consistently above a maximum value for that aggregate of flows, then the transmitted rate of the flow should be reduced. Yet another concept is priority. If the offered rate of a flow is steady, if its transmitted rate is between its min and max, and if it is a member of no set of flows with aggregate transmitted rate above an aggregate maximum value, then the amount of excess bandwidth the flow should receive can be in accordance with its priority so that all of the packets of a Green (high value) flow get service before any of the packets of a Yellow (moderate value) flow get service. Also, all of the packets of a Yellow flow get service before any of the packets of a Red (low value) flow. Again, priority only applies to flows between their min and max values.

Henceforth let the term pipe refers to one or more flows (of packets or of instructions) that require a common transmit probability at a potential bottleneck. A flow can be an important example of a pipe. Accordingly, much of the present invention is described in terms of VLANs within VPs, but as those skilled in the art can readily appreciate, the invention can be just as well applied to other pipe concepts within a hierarchy of aggregation.

At discrete time intervals of constant, configured length Dt, the value of a transmit probability T for each pipe such as each VLAN is refreshed. An algorithm for refreshing transmit probabilities is included in the present invention. A random number is generated and compared to a transmit probability T every time a packet arrives during the time interval Dt. The packet is transmitted if the value of T is greater than or equal to the current value of the random number generator. The packet is discarded if the value of T is less than the random number. In summary, the present invention includes a new method and system for calculating for each pipe such as each flowi a transmit probability Ti. Just as flows can be labeled by integers i=0, 1, 2, 3, . . . , as flow0, flow1, flow2, flow3, . . . , so can the corresponding transmit probabilities be labeled T0, T1, T2, T3, . . . . In terms of transmit/discard flow control, Ti will be the probability that an arriving packet will be transmitted into the processing queue (as opposed to discarded). In terms of transmit/stall flow control, Ti will be the probability that an arriving packet will be transmitted into the processing queue (as opposed to not served immediately and therefore stalled). In the following, each of the three types of probability of transmission is simply called a transmit probability.

The operation of Virtual Local Area Networks (VLANs) requires a structured traffic management system like that addressed by the present invention. In particular, VLAN pipe number i can have a minimum guaranteed bandwidth (mini) and a maximum bandwidth limit (maxi). Furthermore, each set of VLANs called a Virtual Ports (VP) can have aggregate limit (aggj). Two VPs might or might not intersect, that is, have VLAN pipes in common. The concept naturally generalizes to transmit/stall flow control of packets and transmit/stall rate control of instructions.

The present invention calculates at time t the value T(t+Dt) of transmit probability to use during the time interval [t, t+Dt) by application of an algorithm described herein. The inputs to the algorithm for each flow, for example flowi, include the previous transmit probability Ti(t) for flowi used during the interval [t−Dt, t), the current queue level at time t and the and previous queue level at time t−Dt, the recent transmitted flow rate fi of flowi over the interval [t−Dt, t), the values mini and maxi for flowi, and, for each aggregate j containing flowi, the recent aggregate rate of all flows in aggregate j compared to the corresponding aggregate maximum aggj.

FIG. 1 shows a network device 100 with ports, only one of which is shown and identified by numeral 110 that receives packets 101 to be processed in flow management system 111 according to teachings of the present invention. The network device 100 could be a switch, adapter, bridge or similar network devices used to route information in a computer network. Because such devices are well known in the prior art only those portions of the device that include the teachings of the present invention or are necessary to understand the present invention will be discussed herein.

Still referring to FIG. 1, an offered load or packets 101 is a sequence over time of packets that arrive into an arrival queue 110. Flow control 103 uses current congestion information, the value of the current packet, and possibly other information discussed herein to make a decision. If the decision is to discard the packet, then the packet is sent to a discard mechanism 105, and after a short delay the memory resources used by the packet are free for use by other arriving packets. If the decision is to transmit the packet, then the packet is enqueued in a buffer 107. Eventually, the packet appears at the head of the queue 107 and is sent to a processor 109.

Figure 2:
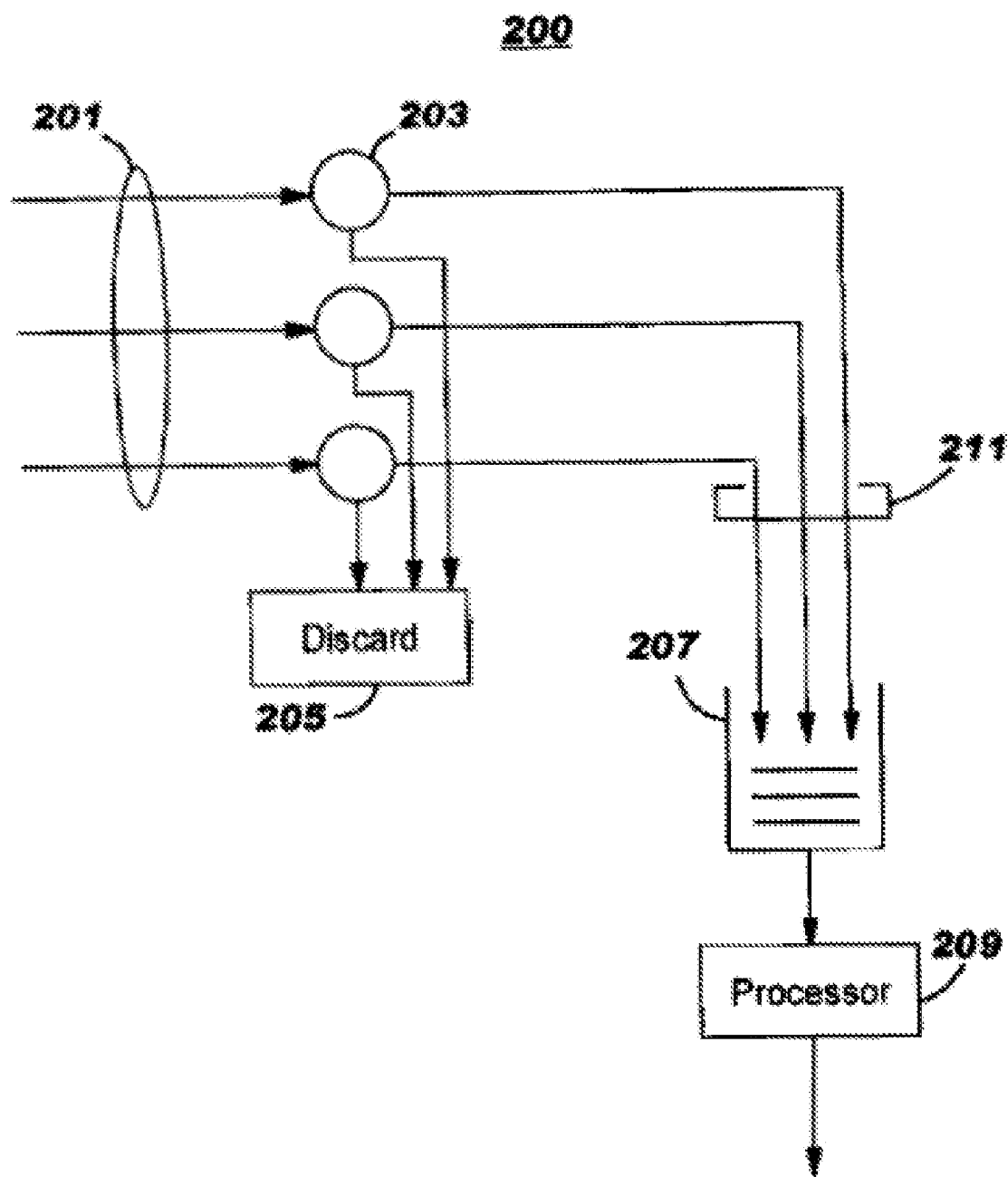
FIG. 2 shows the mechanism of the present invention for transmit/discard flow control. Three flows with three flow controls feed a common processing queue.
Figure 4:
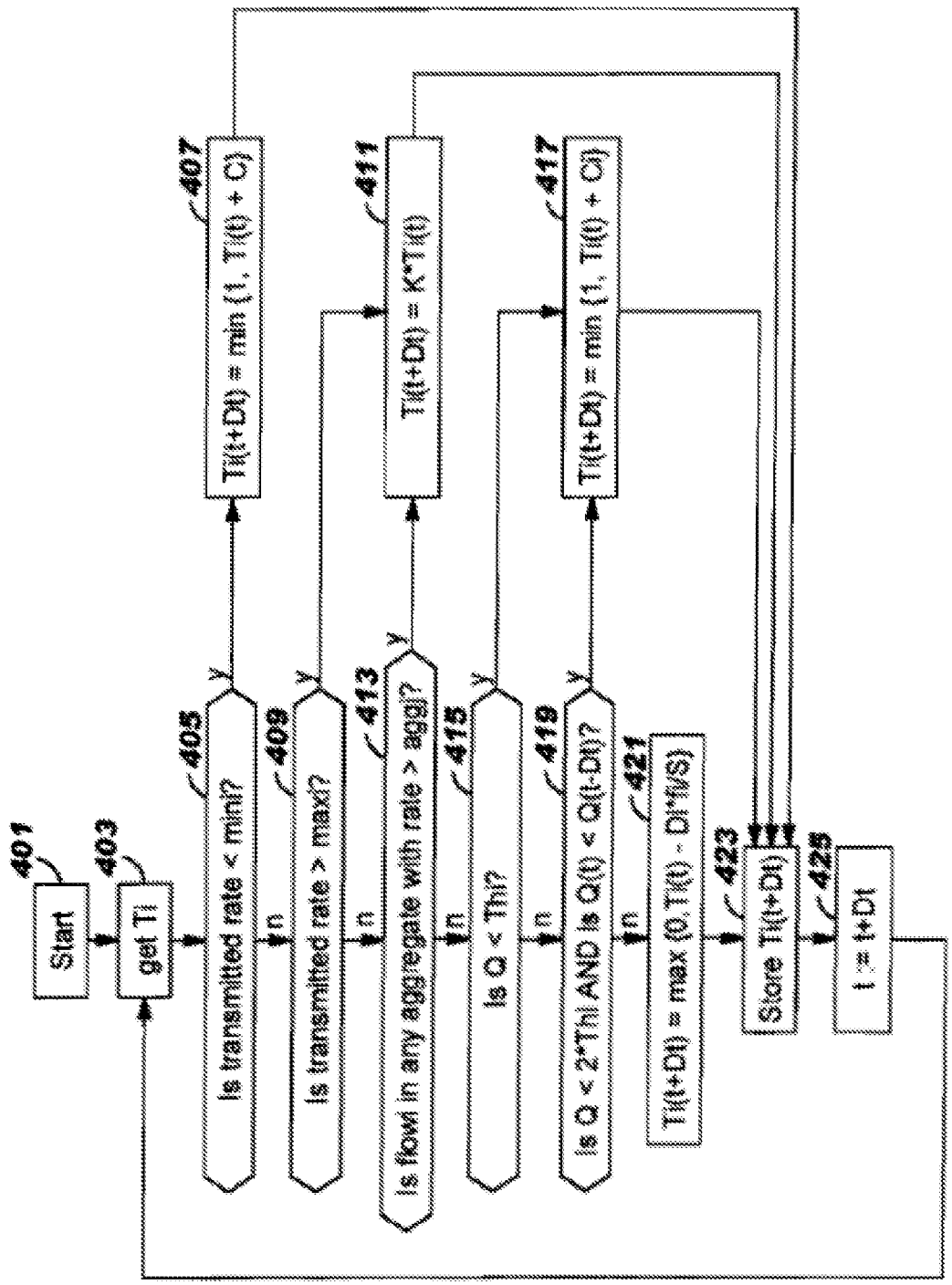
FIG. 4 shows a flow chart for updating the transmit probability Ti(t), that is, calculating Ti(t+Dt) in accordance with the teachings of the present invention.

FIG. 2 shows flow management system 200 arranged differently from that in FIG. 1. Packets arriving at the network device are placed in three flows 201. Although the number of flows shown is three, this is merely to illustrate the concept; the number of flows could be any positive number. For the purpose of illustration, only one aggregate (all three flows) is shown 211. Each of the three flow controls 203 for each flowi applies an algorithm included in this invention and set forth herein to update transmit probabilities Ti. The algorithm, described in a flow chart in FIG. 4, compares the aggregate transmitted rate 211 with the aggj maximum limit for the same aggregate. In the present illustration, only one aggregate is shown, but many aggregates could exist. Also, any two aggregates might or might not have at least one flow in common (intersect as sets). The algorithm also considers current congestion information including occupancy of the queue 207, the rate of change of the occupancy of the queue 207, the transmitted rates of each flowi relative to minimum (mini) and maximum (maxi) rates for each flowi, the economic or administrative value (priority) of the packets in each flow, and possibly other information. The result of the algorithm described in this invention can be a decision to transmit or discard the next arriving packet in a flow. If the decision is to discard the packet, then the packet is sent to a discard mechanism 205, and after a short delay the memory resources used by the packet are free for use by other arriving packets. If the decision is to transmit the packet, then the packet is enqueued in a buffer 207. Eventually, the packet appears at the head of the queue 207 and is sent to a processor 209.

Figure 3:
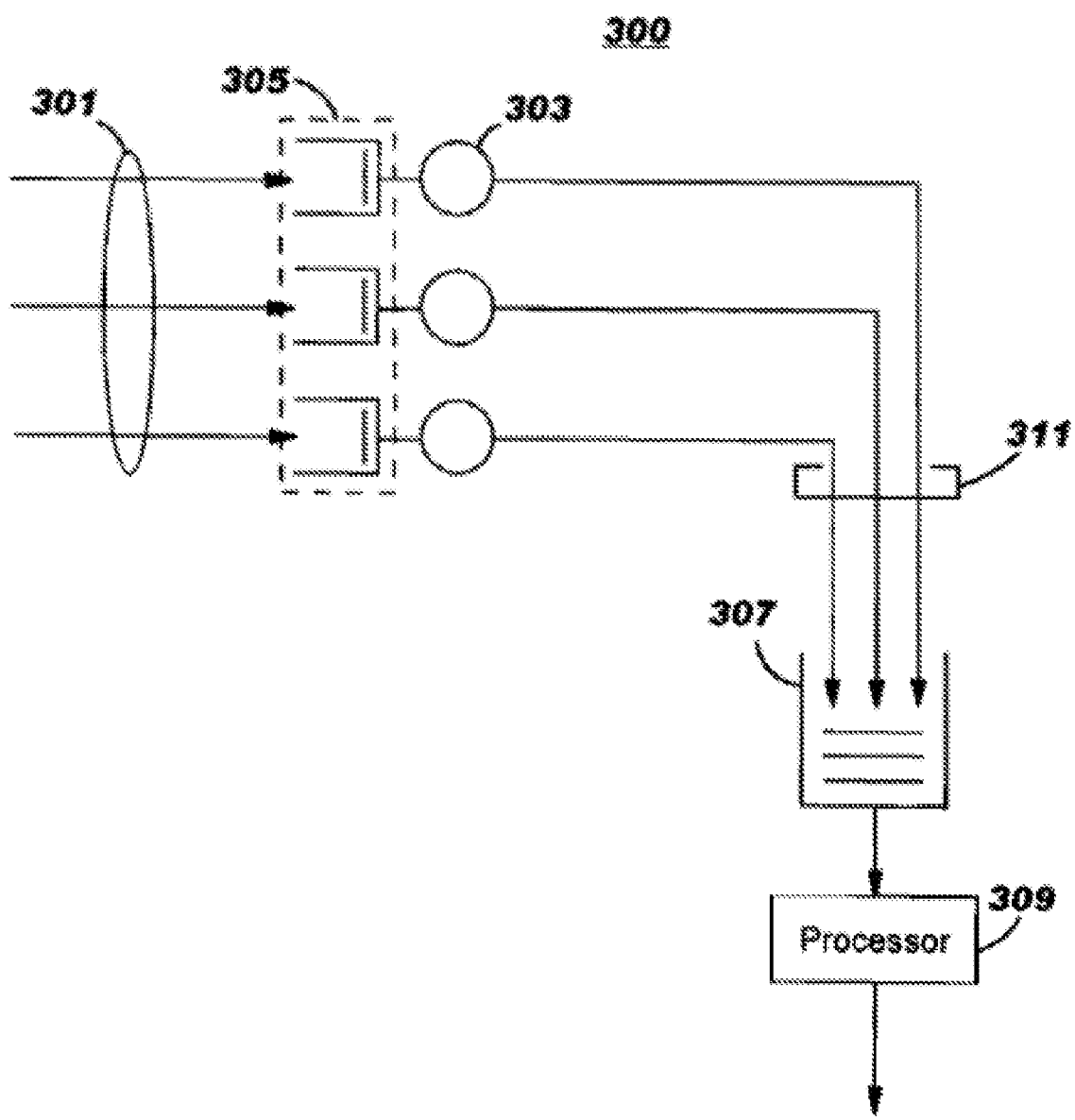
FIG. 3 shows the mechanism of the present invention for transmit/stall flow control. Three flows with three flow controls feed a common processing queue.

In the case of transmit/stall decisions, much the same process applies except that at each service event at each flow control, the next in line packet or instruction is either served (transmitted) or not served (stalled). Referring to FIG. 3, transmit/stall flow control as taught by flow management system 300 of the present invention is depicted. Instructions or packets arriving are placed into three flows 301. Although the number of flows shown is three, this is merely to illustrate the concept; the number of flows could be any positive number. Flows may be organized in aggregates (sets) 311. Each flow control 303 for each flow applies an algorithm included in this invention to update transmit probabilities. The algorithm, described in a flow chart in FIG. 4, compares the aggregate transmitted rate 311 with the aggj maximum limit for aggregate j. In the present illustration, only one aggregate is shown and it happens to be all three flows, but many aggregates could exist. Also, any two aggregates might or might not have at least one flow in common (intersect as sets). The algorithm also considers current congestion information including occupancy of the queue 307, the rate of change of the occupancy of the queue 307, the transmitted rates of each flowi relative to minimum (mini) and maximum (maxi) rates for each flowi, the economic or administrative value (priority) of the packets in each flowi, and possibly other information. The result of the algorithm described in this invention can be a decision to transmit or stall the next-in-line instruction or packet at the next service event. If the decision is to stall the instruction or packet, then the service event is skipped. The existing instructions or packets and possibly arriving instructions or packets 301 simply await further service events in queues 305. If the decision is to transmit the instruction or packet, then the instruction or packet is enqueued in a buffer 307. Eventually, the instruction or packet appears at the head of the queue 307 and is sent to a processor 309.

FIG. 4 shows a flow chart of the Hierarchical Traffic Management algorithm 400 according to the teachings of the present invention. The process starts at 401 and reads the present value Ti 403 of the transmit probability of flowi. The algorithm then determines 405 if the recent transmitted rate of flowi is below the mini (minimum) value for that flow. If yes, then the algorithm branches to box 407 wherein Ti is increased by adding a first constant C such as $1/16$ up to a maximum of 1. If no, then the algorithm determines 409 if the recent transmitted rate of flowi is above the maxi (maximum) value for that flow. If yes, then the algorithm branches to box 411 wherein Ti is decreased by multiplying Ti times a second positive constant K that is less than 1 such as $31/32$. If no, then the algorithm determines 413 if flowi is a member of any aggregate j with the property that the recent aggregate transmitted rate of all the flows in aggregate j is greater than the aggregate limit aggj of aggregate j. If yes, then the algorithm branches to box 411 wherein Ti is decreased by multiplying Ti times a positive constant K that is less than 1 such as $31/32$. If no, then the algorithm determines 415 if the present queue occupancy as a fraction of total queue capacity is less than a certain fraction Thi. If yes, then the algorithm branches to box 417 wherein Ti is increased by adding a third constant Ci (depends upon Priority value of flow i) up to a maximum of 1. If no, then the algorithm determines 419 if the present queue occupancy as a fraction of total queue capacity is less than a certain larger fraction such as 2*Thi AND if the present queue occupancy Q(t) is less than the previous queue occupancy Q(t−Dt). If yes, then the algorithm branches to box 417 wherein Ti is increased by adding a constant Ci up to a maximum of 1 (depends upon Priority value of flow i). Else, Ti is decreased 421 down to a limit of 0 by subtracting from Ti a fourth constant Di (depends upon Priority value of flow i) times the current transmitted rate fi of flowi divided by a maximum possible send rate S. For example, the values of Thi, Ci, and Di might depend in a preferred embodiment upon Priority as in the following table:

In a preferred embodiment, the present invention can incorporate allocation by priority by means of judicious selection of the values Thi and Ci in Step 4 and the value Di in step 5. If priorities are number 0 (highest), 1, 2, 3 (lowest), then in a preferred embodiment:

| Priority | Thi | Ci | Di |
|---|---|---|---|
| 0 (highest) | $1/8$ | $1/128$ | $1/32$ |
| 1 | $1/16$ | $1/256$ | $1/16$ |
| 2 | $1/32$ | $1/512$ | $1/8$ |
| 3 (lowest) | $1/64$ | $1/1024$ | $1/4$ |

After an increase in 407, a decrease in 411, or an increase in 417, or a decrease in 421, the new Ti is stored 423. When current time reaches t+Dt, increment 425 the value of time of the variables in the algorithm to t+Dt. Next loop back to 403 to begin the next update. In the transmit/discard version of the present invention, typically many packets would arrive during Dt time units. In the transmit/stall version of the present invention, typically many service events for instructions or packets would occur during Dt time units.

Figure 5:
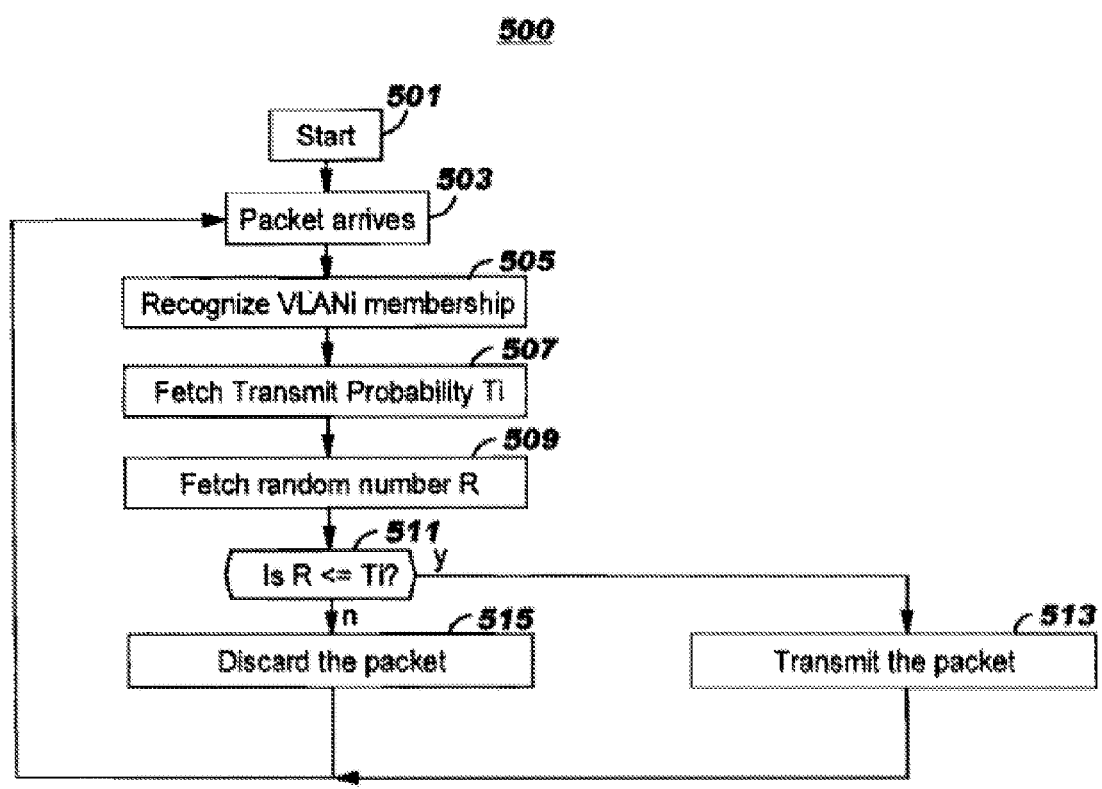
FIG. 5 depicts the sequence of events with transmit/discard flow control as a packet arrives.

Referring to FIG. 5, flowchart 500, shows a process algorithm in which transmit probability Ti (FIG. 4) is used in transmit/discard flow control (FIG. 1). The flow control method starts in 501 and descends to 503 whereat a packet arrives. The packet is recognized 505 as a member of a particular flow such as VLANi. The corresponding transmit probability Ti is fetched 507. Likewise the current value R of a random number generator is fetched 509. Then Ti is compared to R 511. In the transmit/discard type of flow control, if Ti is greater than or equal to R, then the action is to transmit the packet 513. If Ti is less than R, then the action is to discard the packet 515. The mechanism then reacts to the next arriving packet by looping to 503.

Figure 6:
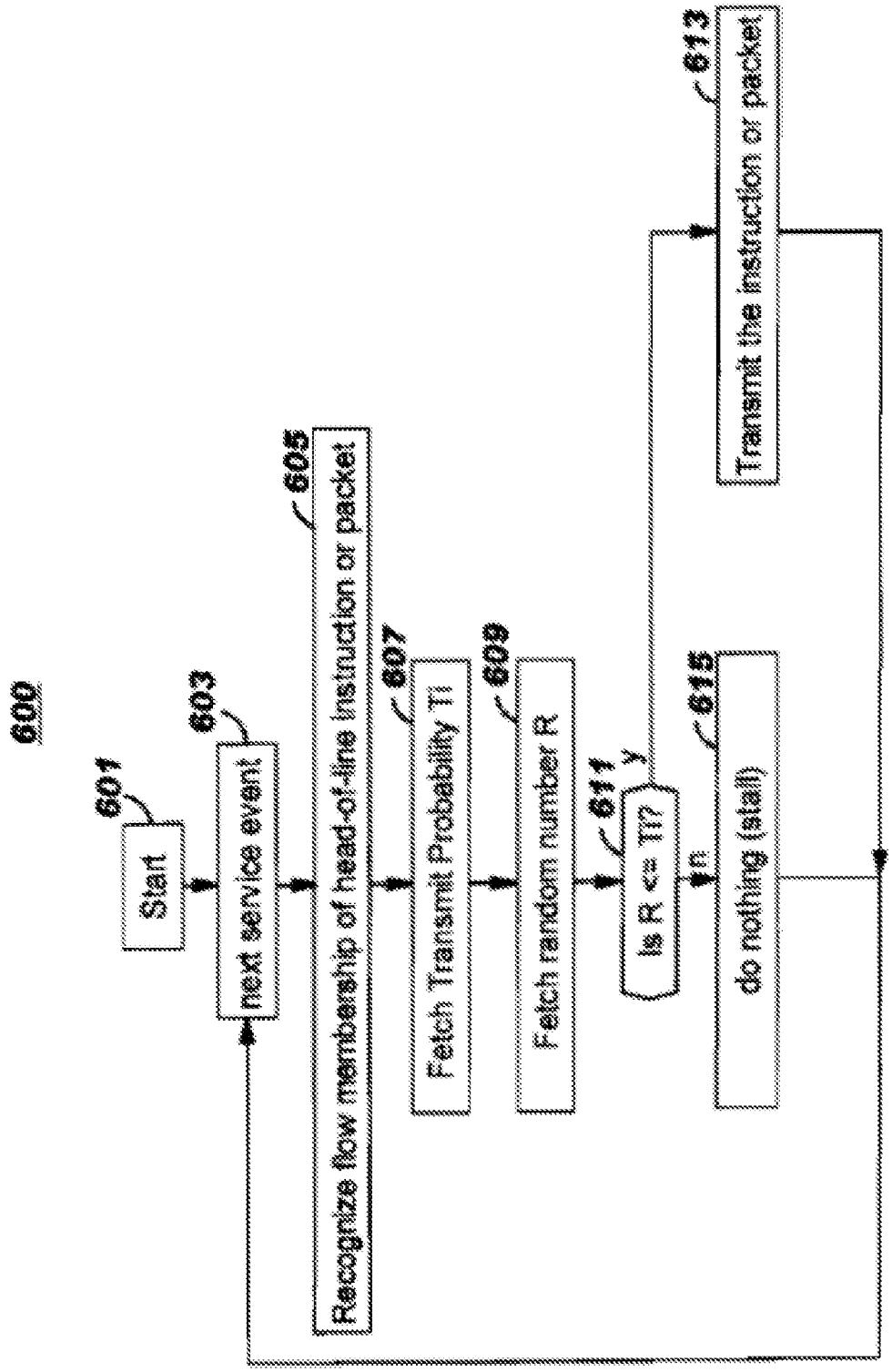
FIG. 6 depicts the sequence of events with transmit/stall flow control as an instruction or packet arrives.

Referring to FIG. 6, flowchart 600, shows a process or algorithm in which transmit probability is used in transmit/stall flow control. The flow control method starts at 601 and service event occurs 603. The instruction or packet is recognized 605 as a member of a particular flow such as flowi. The corresponding transmit probability Ti is fetched 607. Likewise, the current value R of a random number generator is fetched 609. Then Ti is compared to R 611. In the transmit/stall type of flow control, if Ti is greater than or equal to R, then the action is to transmit the packet 613. If Ti is less than R, then the action is to skip the service event (stall) 615. The mechanism then reacts to the next service event by looping to 603.

Figure 7:
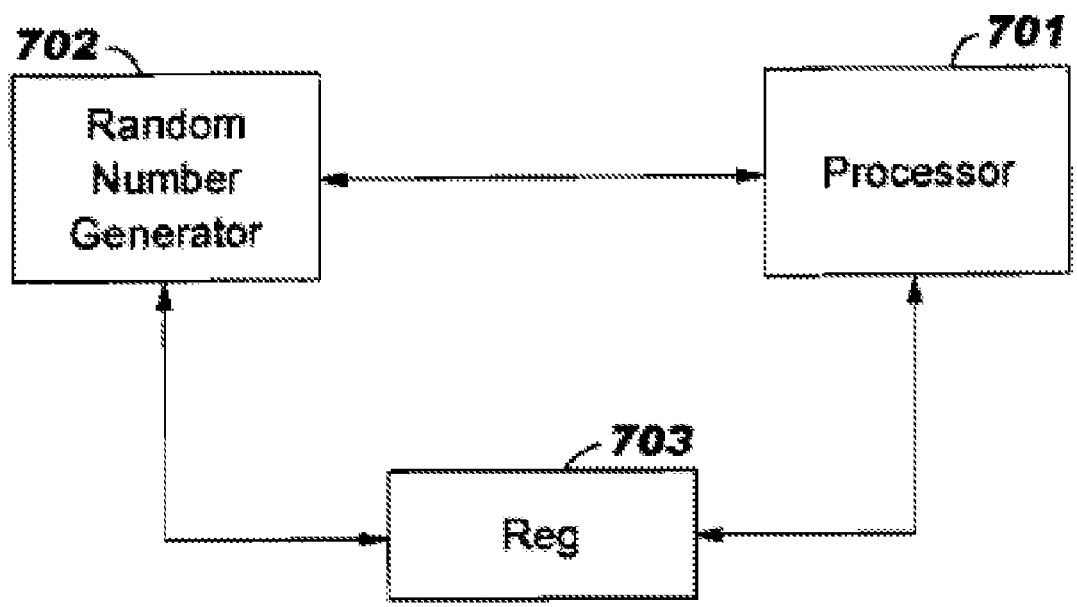
FIG. 7 shows a block diagram of the flow management system according to the teachings of the present invention.

FIG. 7 shows a block diagram of the flow control mechanism which includes a processor 701, a Random Number Generator 702 and a register 703. The named devices are coupled as shown in the figure. The processor could be a specialized one implemented in hardware based upon the teachings of the present invention. Alternately, the processor could be a standard computer including an operating system upon which application programs generated by the teachings of the present invention are executed. The random number generator, a conventional unit or a specialized one, generates random numbers used to make transmit/no transmit decisions according to the teachings of the present invention. The processor 701 can communicate directly with random number generator 702 or via register 703.

The precise values for threshold Thi, linear increase coefficient Ci, and exponential decrease coefficient Di shown above are not important; the relative values Priority to Priority are important. Note again, the use of Thi, Ci, and Di terms pertains only to pipes or flows with transmitted rates between their min and max values and to the case that VP aggregate limits are not reached by any VPs in which the flows in question are members. In effect, the choice of the above Thi values means that Priority 0 traffic will not be subject to Ti reduction unless queue occupancy Q is relatively high, that is, over $1/8$; by contrast the choice of the Thi value for Priority 3 traffic means that such traffic will be constrained by flow control if the queue occupancy Q is relatively low, that is, any value over $1/64$. Furthermore, when excess bandwidth is available, the rate of linear increase of Priority 0 traffic is relatively fast because Ci=$1/128$. By contrast when excess bandwidth is available, the rate of linear increase of Priority 3 traffic is relatively slow because Ci=$1/1024$. Finally, when excess bandwidth is not available, the rate of exponential decrease of Priority 0 traffic is relatively slow because Di=$1/32$. By contrast when excess bandwidth is not available, the rate of exponential decrease of Priority 3 traffic is relatively fast because Di=$1/4$. Again, the precise values of Thi, Ci, Di are not important. Rather, the present invention includes the practice that as Priority changes from 0 (highest) to 3 (lowest), the values of Thi should decrease, the values of Ci should decrease, and the values of Di should increase.

Following are examples illustrating usage and effect of the present invention.

EXAMPLE 1

Suppose four VLANs indexed 0, 1, 2, 3 are in three VPs indexed 0, 1, 2. Bandwidth is in some units so that 1.000 is the link speed (physical upper limit). Let the VPs be defined as VP0={0,1}, VP1=(0,2}, VP2={0,3}. Suppose agg0=0.200 and agg1=agg2=1.000. Suppose all four VLANs offered traffic at the rate 0.500. Suppose VLAN3 has Priority=1 and all three other VLANs have Priority=0. Suppose all VLANs have the same mini=0, and the same maxi=1.000. Then the correct allocation is as follows.

| VLAN | Priority | min | max | offer | allocation |
|------|----------|-----|-------|-------|------------|
| 0 | 0 | 0 | 1.000 | .750 | .150 |
| 1 | 0 | 0 | 1.000 | .250 | .050 |
| 2 | 0 | 0 | 1.000 | .500 | .500 |
| 3 | 1 | 0 | 1.000 | .500 | .300 |
| | | | | | 1.000 |

The equilibrium Queue occupancy in a typical model of the invention is 0.13, that is, 13% of buffer capacity.

Note that the VP0 allocation is 0.200, as it should be since this is a limiting factor on VLAN0 and VLAN1 bandwidth allocation. VLAN0 offers three times the traffic of VLAN1 and is allocated three times the bandwidth, as it should be. After the constraints on VLANs 0 and 1 are felt, a total of 0.800 units of bandwidth remains. Since VLAN2 has higher Priority than VLAN3 and since the excess bandwidth exceeds the offered rate of VLAN2, all of the packets of VLAN2 are transmitted. Finally, VLAN3 gets all the remaining bandwidth, namely, 0.300 units. Therefore, utilization is high and allocation is fair.

It should be understood that conventional Hierarchical Traffic Management methods use Weighted Fair Queuing or similar hand-tuned scheduling policies or algorithms. Methods for transmit/discard flow control that rely upon scheduling (precise timing of packets sent) and taildrop flow control per flow queue usually do not specify taildrop thresholds. This leaves open the possibility of unpredictable queuing latency. There is a difficult administrative choice with taildrop thresholds: low thresholds will possibly cause excessive burst shaving, but high thresholds will possibly cause high queuing latency during steady congestion. Therefore the present invention has two advantages, described as follows.

1. By using only raw performance parameters (mins, maxs, aggregate limits) as inputs, not weights, the present invention simplifies administration. No "tuning" of abstract thresholds is required.
2. The present invention nonetheless achieves several goals of Hierarchical Traffic Management, namely, enforcement of flow maxs, protection of flow mins, enforcement of aggregate maxs, enforcement of Priority, fairness, high utilization, low queue occupancy during steady congestion, and fast convergence as offered traffic loads change to new, correct allocations.

By contrast, conventional hierarchical bandwidth allocation papers typically specify a system of schedulers within schedulers that provides eventually an allocation solution. However, papers in the literature do not always include flow control that will keep queue occupancy and queuing latency low. Hidden assumptions in such papers can possibly include: the packets have constant value regardless of queuing latency; storage is infinite; unpredictable and possible long queuing latencies associated with taildrop flow control are acceptable.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teaching and advanced use of this invention. Accordingly, all such modifications are intended to be included within the scope of this invention as defined in the claims.

What is claimed is:

1. A method to manage traffic in a system of a computer network, comprising:
    configuring a processor in communication with a random number generator and a storage queue to set a transmit probability to a value between zero and one for receiving traffic from at least one flow of a plurality of flows ported into the processor by:
    reading a present value of the transmit probability of the at least one flow;
    determining at least one of if the present value is below a minimum value for the at least one flow, if the present value is above a maximum value for the at least one flow and if the at least one flow is a member of an aggregate of the plurality of flows wherein a recent aggregate transmitted rate of all flows in the aggregate is greater than an aggregate limit;
    if the present value is below the minimum value or above the maximum value or the recent aggregate transmitted rate is greater than the aggregate limit, then setting the transmit probability to a sum of the present value and a first positive constant or to a product of the present value multiplied by a second constant, the second positive constant having a value less than one; and
    if the present value is above the minimum value and below the maximum value and the recent aggregate transmitted rate is not greater than the aggregate limit, then:
        determining if a present occupancy of the queue is less than a certain fractional value of a total capacity of the queue, and if the present occupancy of the queue is less than the certain fractional value, then setting the transmit probability to a sum of the present value and a third constant:
        if the present queue occupancy is not less than the certain fractional value, then determining if the present queue occupancy is less than another fractional value of the total queue capacity larger than the certain fractional value and if the present queue occupancy is less than a previous queue occupancy, and if the present queue occupancy is less than the another fractional value and the present queue occupancy is less than the previous queue occupancy, then setting the transmit probability to a sum of the present value and a fourth constant; and
        if the present queue occupancy is not less than the certain fraction value and if either of the present queue occupancy is not less than the another fraction or the present queue occupancy is not less than a previous queue occupancy, then setting the transmit probability to the present value less a value of a fourth constant multiplied by a current transmitted rate of the at least one flow and divided by a maximum possible send rate of the at least one flow;

wherein the processor is further configured to compare a random number generated by the random number generator with the set transmit probability and make a transmit decision regarding said at least one flow based upon a result of the comparison.

2. The method of claim 1 wherein the traffic includes data packets, and the transmit decision comprises transmitting data packets from said at least one flow if the random number is less than or equal ($\leqq$) to the set transmit probability.

3. The method of claim 1 wherein the traffic includes data packets, and the transmit decision comprises not transmitting traffic from said at least one flow if the random number is greater than (>) the set transmit probability.

4. The method of claim 3 wherein the transmit decision of not transmitting traffic comprises discarding the traffic.

5. The method of claim 3 wherein the transmit decision of not transmitting traffic comprises delaying transmission of traffic.

6. The method of claim 1 further including configuring the processor to:
assign a value for the minimum flow rate and a value for the maximum flow rate for the at least one flow; and
use the assigned minimum flow rate and maximum flow rate for the setting of the transmission probability.

7. The method of claim 1 further including configuring the processor to set values of the third constant, the fourth constant and the certain fractional value of the total queue capacity as a function of a priority of the at least one flow relative to a priority of another flow of the plurality of flows ported into the processor.

8. The method of claim 7 wherein the at least one flow priority is a next-higher priority relative to the priority of the another flow;
wherein the third constant of the higher-priority at least one flow has a value double a value of the third constant of the another flow;
wherein the fourth constant of the higher-priority at least one flow has a value one-half of a value of the fourth constant of the another flow; and
wherein the certain fractional value of the total queue capacity of the higher-priority at least one flow is double a value of the certain fractional value of the total queue capacity of the another flow.

9. The method of claim 8 further including configuring the processor to set the transmit probability within a same time period used as the flow rate sample time period.

10. The method of claim 9 wherein a value of the flow rate sample time period is about equal to a product of one-eighth times the total queue capacity divided by the maximum total flow rate.

11. A network device, comprising:
a specialized processor implemented in hardware, the processor in communication with a random number generator and a storage queue;
wherein the processor is configured to manage traffic in a system of a computer network by setting a transmit probability for receiving traffic from at least one flow of a plurality of flows ported into the processor to a value between zero and one, by:
reading a present value of the transmit probability of the at least one flow;
determining at least one of if the present value is below a minimum value for the at least one flow, if the present value is above a maximum value for the at least one flow and if the at least one flow is a member of an aggregate of the plurality of flows wherein a recent aggregate transmitted rate of all flows in the aggregate is greater than an aggregate limit;
if the present value is below the minimum value or above the maximum value or the recent aggregate transmitted rate is greater than the aggregate limit, then setting the transmit probability to a sum of the present value and a first positive constant or to a product of the present value multiplied by a second constant, the second positive constant having a value less than one; and
if the present value is above the minimum value and below the maximum value and the recent aggregate transmitted rate is not greater than the aggregate limit, then:
determining if a present occupancy of the queue is less than a certain fractional value of a total capacity of the queue, and if the present occupancy of the queue is less than the certain fractional value then setting the transmit probability to a sum of the present value and a third constant;
if the present queue occupancy is not less than the certain fractional value, then determining if the present queue occupancy is less than another fractional value of the total queue capacity larger than the certain fractional value and if the present queue occupancy is less than a previous queue occupancy, and if the present queue occupancy is less than the another fractional value and the present queue occupancy is less than the previous queue occupancy, then setting the transmit probability to a sum of the present value and a fourth constant; and
if the present queue occupancy is not less than the certain fraction value and if either of the present queue occupancy is not less than the another fraction or the present queue occupancy is not less than a previous queue occupancy, then setting the transmit probability to the present value less a value of a fourth constant multiplied by a current transmitted rate of the at least one flow and divided by a maximum possible send rate of the at least one flow;
wherein the processor is further configured to compare a random number generated by the random number generator with the set transmit probability and make a transmit decision regarding said at least one flow based upon a result of the comparison.

12. The network device of claim 11 wherein the traffic includes data packets and the transmit decision comprises transmitting data packets from said at least one flow if the random number is less than or equal ($\leqq$) to the set transmit probability.

13. The network device of claim 11 wherein the traffic includes data packets and the transmit decision comprises not transmitting traffic from said at least one flow if the random number is greater than (>) the set transmit probability.

14. The network device of claim 13 wherein the transmit decision of not transmitting traffic comprises discarding the traffic.

15. The network device of claim 13 wherein the transmit decision of not transmitting traffic comprises delaying transmission of traffic.

16. The network device of claim 11 wherein the processor is further configured to:
assign a value for the minimum flow rate and a value for the maximum flow rate for the at least one flow; and
use the assigned minimum flow rate and maximum flow rate for the setting of the transmission probability.

17. The network device of claim 11 wherein the processor is further configured to set values of the third constant, the fourth constant and the certain fractional value of the total queue capacity as a function of a priority of the at least one flow relative to a priority of another flow of the plurality of flows ported into the processor.

18. The network device of claim 17 wherein the at least one flow priority is a next-higher priority relative to the priority of the another flow;
 wherein the third constant of the higher-priority at least one flow has a value double a value of the third constant of the another flow;
 wherein the fourth constant of the higher-priority at least one flow has a value one-half of a value of the fourth constant of the another flow; and
 wherein the certain fractional value of the total queue capacity of the higher-priority at least one flow is double a value of the certain fractional value of the total queue capacity of the another flow.

19. The network device of claim 18 wherein the processor is further configured to set the transmit probability within a same time period used as the flow rate sample time period.

20. The network device of claim 19 wherein a value of the flow rate sample time period is about equal to a product of one-eighth times the total queue capacity divided by the maximum total flow rate.

\* \* \* \* \*